US012387691B2

(12) United States Patent
Zhou et al.

(10) Patent No.: US 12,387,691 B2
(45) Date of Patent: Aug. 12, 2025

(54) METHOD AND DEVICE FOR PICTURE DETECTION ON A PRESET DETECTION AREA OF A DISPLAY PANEL, DISPLAY PANEL, AND COMPUTER-READABLE STORAGE MEDIUM

(71) Applicant: HKC CORPORATION LIMITED, Guangdong (CN)

(72) Inventors: Mancheng Zhou, Guangdong (CN); Junfeng Xie, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/673,740

(22) Filed: May 24, 2024

(65) Prior Publication Data

US 2025/0014529 A1 Jan. 9, 2025

(30) Foreign Application Priority Data

Jul. 6, 2023 (CN) ......................... 202310824717.7

(51) Int. Cl.
*G09G 3/36* (2006.01)

(52) U.S. Cl.
CPC ......... *G09G 3/3607* (2013.01); *G09G 3/3614* (2013.01)

(58) Field of Classification Search
None
See application file for complete search history.

(56) References Cited

U.S. PATENT DOCUMENTS

2011/0141153 A1* 6/2011 Lee ...................... G09G 3/3614 345/88
2013/0265288 A1* 10/2013 Woo ..................... G09G 3/3614 345/96
2015/0302812 A1* 10/2015 Jeong .................. G09G 3/3614 345/209
2020/0251063 A1* 8/2020 Liu .......................... G09G 3/36

FOREIGN PATENT DOCUMENTS

CN 115565503 A 1/2023
CN 115881008 A 3/2023
CN 116092439 A 5/2023
CN 116229914 A 6/2023

* cited by examiner

*Primary Examiner* — Kirk W Hermann

(57) ABSTRACT

A method includes steps of: obtaining a grayscale value of each sub-pixel in each minimum detection unit respectively; and exiting a picture detection function if at least one of the x minimum detection units meets a first preset condition corresponding to the at least one of the x minimum detection units when the picture detection function for a preset detection area is in an enabled state. A first preset condition corresponding to a first minimum detection unit is that the grayscale value of at least one sub-pixel of a first type is smaller than or equal to a first value, or alternatively, the grayscale value of at least one sub-pixel of a second type is greater than or equal to a second value.

20 Claims, 5 Drawing Sheets

| DOT_C | POL | POLC | Y1 | Y2 | Y3 | Y4 | Y5 | Y6 |
|---|---|---|---|---|---|---|---|---|
| L | L | L | + | - | + | - | + | - |
| | L | H | - | + | - | + | - | + |
| | H | L | - | + | - | + | - | + |
| | H | H | + | - | + | - | + | - |
| H | L | L | + | - | - | + | + | - |
| | L | H | - | + | + | - | - | + |
| | H | L | - | + | + | - | - | + |
| | H | H | + | - | - | + | + | - |
FIG. 8
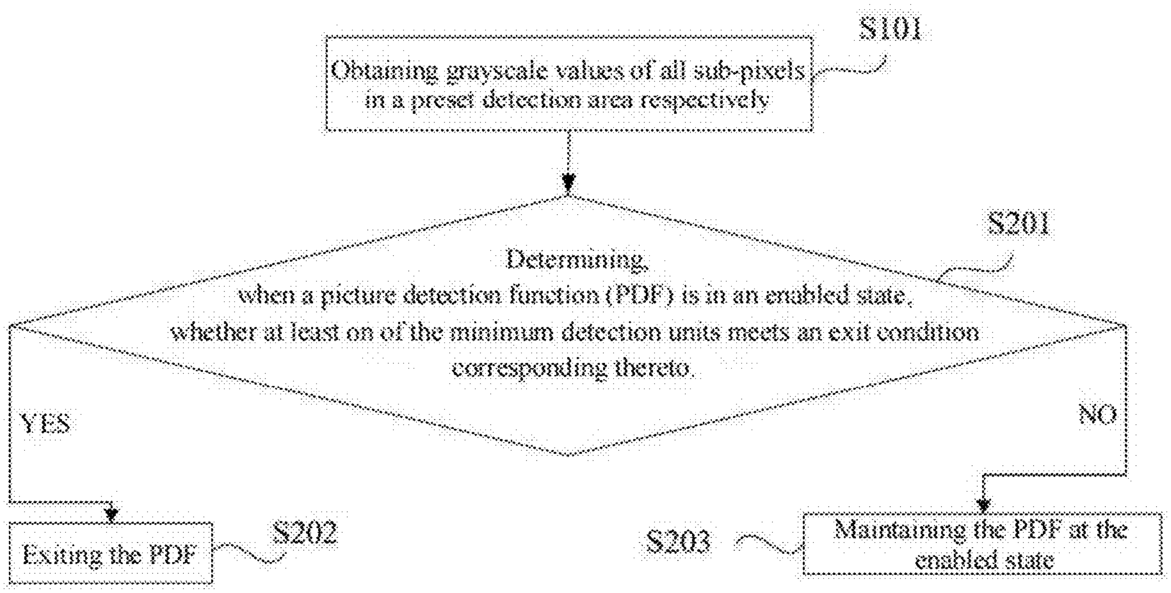
FIG. 9
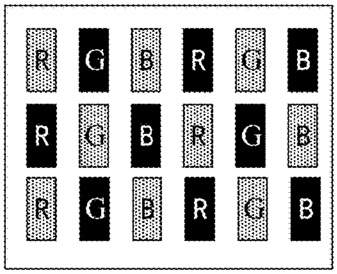
FIG. 10A
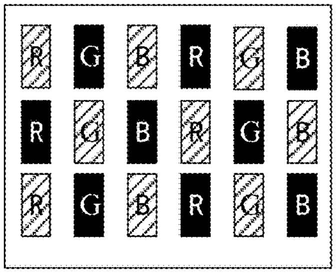
FIG. 10B
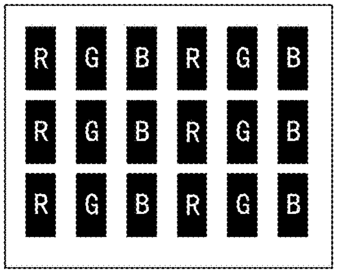
FIG. 10C

METHOD AND DEVICE FOR PICTURE DETECTION ON A PRESET DETECTION AREA OF A DISPLAY PANEL, DISPLAY PANEL, AND COMPUTER-READABLE STORAGE MEDIUM

CROSS-REFERENCE TO RELATED APPLICATION

Pursuant to 35 U.S.C. § 119 and the Paris Convention, this application claims the benefit of Chinese Patent Application No. 202310824717.7, filed on Jul. 6, 2023, the content of which is incorporated herein by reference.

TECHNICAL FIELD

The present application relates to the field of display technology, and in particular, to a method and a device for a picture detection, a display panel and a computer-readable storage medium.

BACKGROUND

The statements provided herein are merely background information related to the present application, and do not necessarily constitute any prior arts. Thin film transistor liquid crystal display (TFT-LCD), compared with traditional cathode ray tube (CRT) displays, plasma displays, etc., has the advantages of low power consumption, environmental protection, and space saving. Currently, TFT-LCD is also developing towards higher resolution, higher display quality and larger size.

Each sub-pixel of TFT-LCD includes a liquid crystal capacitor and a storage capacitor. One end of the liquid crystal capacitor and storage capacitor is connected to the pixel electrode, and the other end is connected to the common electrode (VCOM). When TFT-LCD is driven, the common electrode is prone to be interfered by a data line, which results in voltage jitter, and then leads to an abnormal phenomenon such as crosstalk in the display screen. Usually, the picture detection function (PDF) is applied to solve this problem.

However, in related technologies, TFT-LCD cannot accurately exit the picture detection function after the picture detection function is enabled, which will cause a waste of resources.

SUMMARY

The present application provides a method and a device for a picture detection, a display panel and a computer-readable storage medium, which can accurately exit the picture detection function and save resources. Technical schemes of the present application are as follows:

In accordance with a first aspect, a method for a picture detection is provided, and the method includes steps of: obtaining a grayscale value of each sub-pixel in each minimum detection unit respectively; exiting a picture detection function if at least one of x minimum detection units meets its corresponding first preset condition when the picture detection function for the preset detection area is in an enabled state. A first preset condition corresponding to a first minimum detection unit is that the grayscale value of at least one sub-pixel of a first type is smaller than or equal to a first value, or the grayscale value of at least one sub-pixel of a second type is greater than or equal to a second value. The first minimum detection unit is any one of the x minimum detection units, the sub-pixel of the first type refers to a sub-pixel in the first minimum detection unit whose grayscale value is greater than or equal to a third value when the picture detection function is enabled, and the sub-pixel of the second type refers to a sub-pixel in the first minimum detection unit whose grayscale value is smaller than or equal to a fourth value when the picture detection function is enabled. The first value is smaller than the third value, the second value is greater than the fourth value, the first value is greater than the second value, and the third value is greater than the fourth value.

In some possible implementations, the third value and the fourth value are respectively determined based on original grayscale values of all sub-pixels in the first minimum detection unit. The original grayscale values refer to grayscale values of the sub-pixels before the picture detection function is enabled.

In some possible implementations, the method also includes a step of maintaining the picture detection function at the enabled state if each of the x minimum detection units does not meet its corresponding first preset condition when the picture detection function is in the enabled state.

In some possible implementations, the method also includes a step of enabling the picture detection function if each of the x minimum detection units meets its corresponding second preset condition when the picture detection function is in a disabled state. A second preset condition corresponding to the first minimum detection unit includes that at least one sub-pixel of the first type and at least one sub-pixel of the second type are both presented in the first minimum detection unit.

In some possible implementations, the method also includes a step of maintaining the picture detection function at the disabled state if at least one of the x minimum detection units does not meet its corresponding second preset condition when the picture detection function is in the disabled state.

In some possible implementations, the second preset condition corresponding to the first minimum detection unit also includes that an area of the preset detection area exceeds a preset area threshold.

In some possible implementations, the step of exiting the picture detection function includes a step of exiting the picture detection function after scanning a current frame of picture and before starting to scan a next frame of picture.

In the method for the picture detection provided by the embodiment of the present application, the grayscale values of all sub-pixels in the preset detection area are obtained respectively, and the picture detection function is exited if at least one of the minimum detection units meets its corresponding exit condition when the picture detection function is in the enabled state. By improving the conditions for exiting the picture detection function, this method closely combines the causes of crosstalk with the conditions for exiting the picture detection function, so that the conditions for exiting the picture detection function can cover situations of complete black and full brightness of the screen, as well as other situations where the polarity distribution is uniform but the picture detection function needs to be exited. In addition, for the pictures that will not cause crosstalk, the picture detection function is excluded (i.e. exited), thus the accuracy of the picture detection function is improved, and a waste of resources is avoided.

In a second aspect, a device for a picture detection is provided. The device for the picture detection includes an acquisition circuitry and a determination circuitry.

In a third aspect, a display panel is provided. The display panel includes a memory, a processor, and a computer program stored in the memory and executable by the processor. The computer program, when executed by the processor, enables the above method for the picture detection to be implemented.

In a fourth aspect, a computer-readable storage medium is provided. The computer-readable storage medium stores a computer program. The computer program, when executed by a processor, causes the above-mentioned method for the picture detection to be implemented.

It can be understood that, for beneficial effects of the above second aspect, third aspect, and fourth aspect, references may be made to the relevant descriptions in the above first aspect, which will not be described again here.

BRIEF DESCRIPTION OF DRAWINGS

In order to more clearly illustrate the technical schemes in the embodiments of the present application, the drawings needed to be used in the description of the embodiments will be briefly introduced below. Obviously, the drawings in the following description are merely some embodiments of the present application. For those of ordinary skill in the art, other drawings can also be obtained based on these drawings without exerting creative efforts.

FIG. 8 is a schematic diagram of a polarity inversion for a sub-pixel provided by an embodiment of the present application;

FIG. 9 is a flow chart of a method for exiting a picture detection provided by an embodiment of the present application;

FIG. 10A to FIG. 10C are schematic diagrams showing an example process of enabling or exiting the picture detection function provided by an embodiment of the present application;

DETAILED DESCRIPTION OF EMBODIMENTS

In order to make the objective, technical schemes and advantages of the present application much clearer, the embodiments of the present application will be further described in detail below with reference to the accompanying drawings.

It should be understood that the word "multiple" mentioned in the present application means two or more. In the description of the present application, unless otherwise stated, the symbol "/" means or, for example, A/B can mean A or B; "and/or" here is just an association relationship describing related objects, which means that there may be three relationships, for example, A and/or B, may mean that: A exists alone, A and B exist simultaneously, and B exists alone. In addition, to facilitate a clear description of the technical scheme of the present application, words such as "first" and "second" are used to distinguish identical or similar items with basically the same functions and effects. Those skilled in the art can understand that words such as "first" and "second" do not limit the number and execution order, and words such as "first" and "second" do not necessarily limit different.

Before the detailed explanation of the embodiments of the present application, application scenarios of the embodiments of the present application are described herein.

Figure 1:
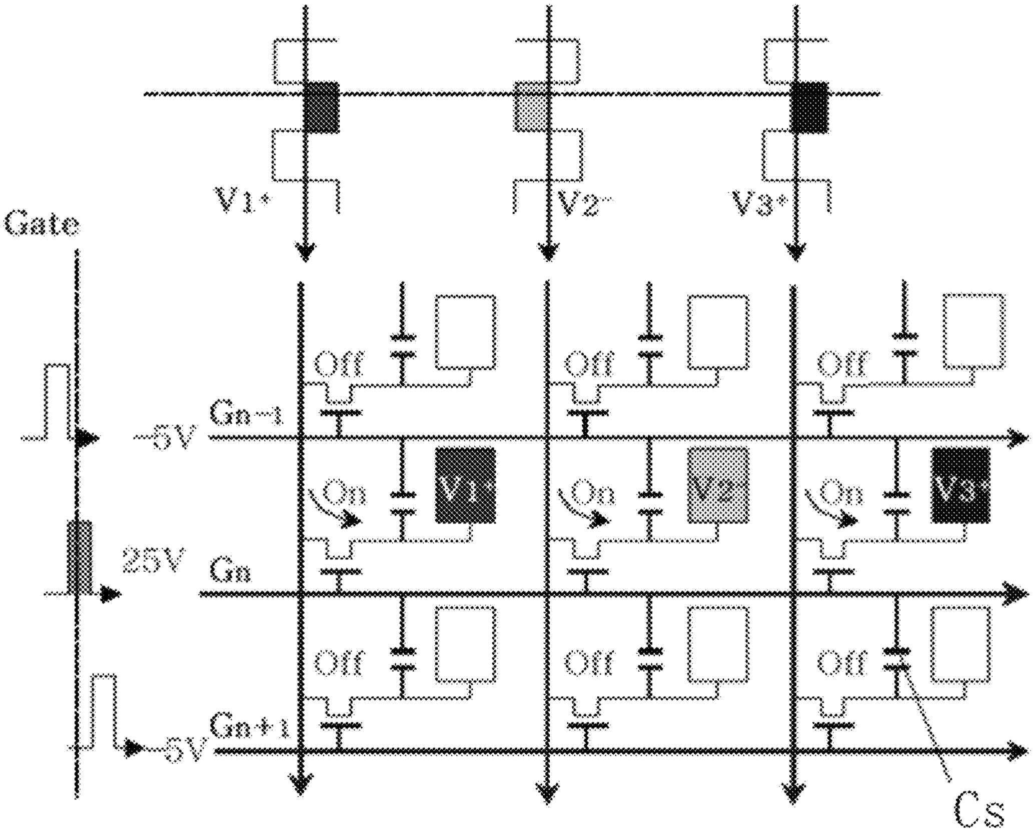
FIG. 1 is a schematic diagram of a scan driving of a display panel provided by an embodiment of the present application.

The method for the picture detection provided by an embodiment of the present application is applied to a display panel and configured to perform picture detection on the display panel. Taking TFT-LCD as an example, a driving mode of the display panel may be a line-by-line scan driving. Particularly, as shown in FIG. 1, the display panel includes multiple rows of scan lines and multiple columns of data lines, multiple pixels, and multiple switch circuits (for example, TFT-LCD circuits) corresponding to multiple sub-pixels. When the display panel is working, a scan signal is applied to a scan line to control a switch circuit to be switched on. A gray-scale voltage will be applied to a data line, so that the gray-scale voltage is written by the data line into the corresponding sub-pixel through the switch circuit to charge the sub-pixel, to enable the corresponding sub-pixel to emit light. When the display panel displays a frame of picture, starting from a first row of scan lines, multiple rows of scan lines output scan signals row by row to control multiple sub-pixels to emit light row by row. Taking the Gn-th row of sub-pixels on the display panel as an example, when the signal input by the scan line Gn is at a high level, the switch circuit of this row is switched on, and the gray-scale voltage is written to each sub-pixel of this row through the data lines in column directions to charge the sub-pixels, and then sub-pixels in this row are enabled to emit light.

Figure 2:
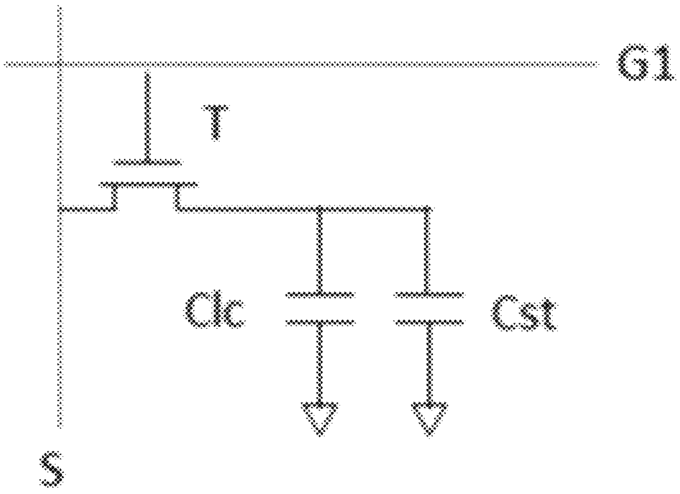
FIG. 2 is a schematic diagram of a switch circuit of an example sub-pixel provided by an embodiment of the present application.

Taking any sub-pixel in the row G1-th as an example, a schematic diagram of the corresponding switch circuit is shown in FIG. 2. The switch circuit includes a control switch T, a liquid crystal capacitor Clc and a storage capacitor Cst. The control switch T is connected to the scan line G1 and the data line S respectively. The scan line G1 is used to input a scan signal to the control switch T to control the control switch T to be switched on. The data line S is used to write the gray-scale voltage to the control switch T to charge the liquid crystal capacitor Cst and storage capacitor Clc. Charging ends of the liquid crystal capacitor Cst and the storage capacitor Clc are connected to a common electrode (VCOM).

Figure 3:
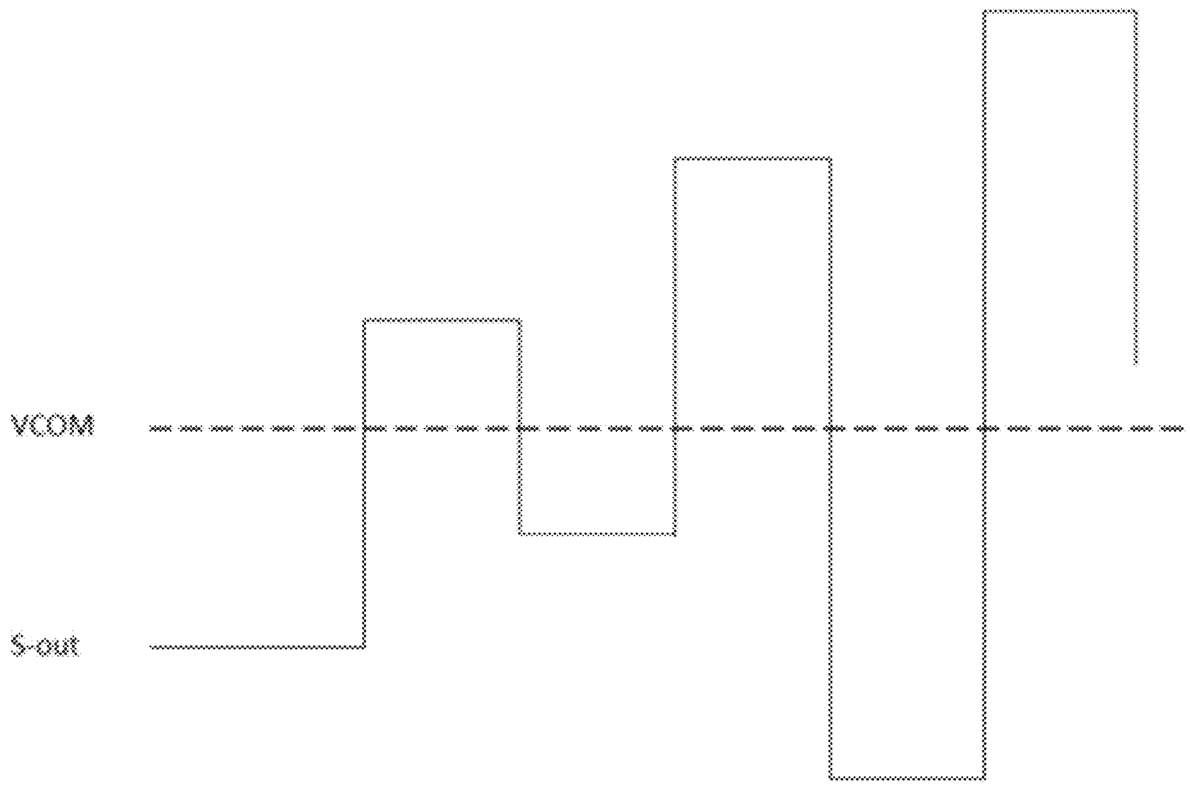
FIG. 3 is a schematic waveform diagram of an AC data signal S-out output by a data line according to an embodiment of the present application.
Figure 4:
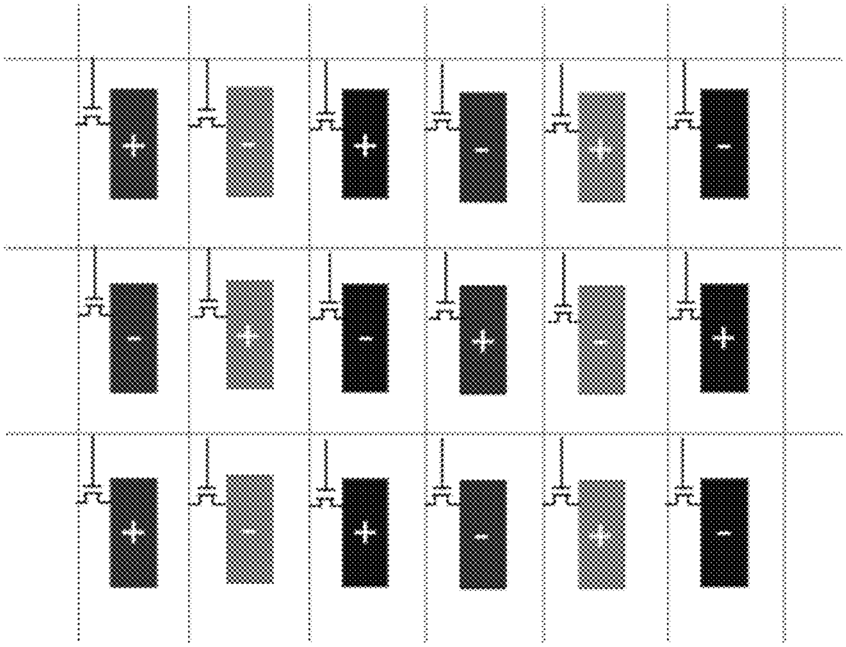
FIG. 4 is a schematic diagram of polarities corresponding to partial sub-pixels of an example display panel provided by an embodiment of the present application.

Based on the switch circuit shown in FIG. 2, if the switch circuit is driven by a direct current (DC) circuit (that is, the data signal input by the data line is a DC), then residual charges will be generated at both ends of the liquid crystal capacitor Cst and storage capacitor Clc, and there will be residual images during display. To avoid this phenomenon, the DC needs to be changed to an alternating current (AC). Exemplarily, FIG. 3 is a schematic waveform diagram of the AC data signal S-out output by the data line in one embodiment. FIG. 4 is a schematic diagram of polarities corresponding to partial sub-pixels of the display panel in one embodiment. The symbol "+" indicates that the voltage of the data signal input by the sub-pixel (referred to as the data voltage) is higher or lower than the voltage of VCOM. Specifically, the polarity of the sub-pixel is "+" when the data voltage input by the sub-pixel is higher than VCOM; and the polarity of the sub-pixel is "−" when the data voltage input by the sub-pixel is lower than VCOM.

Figure 5:
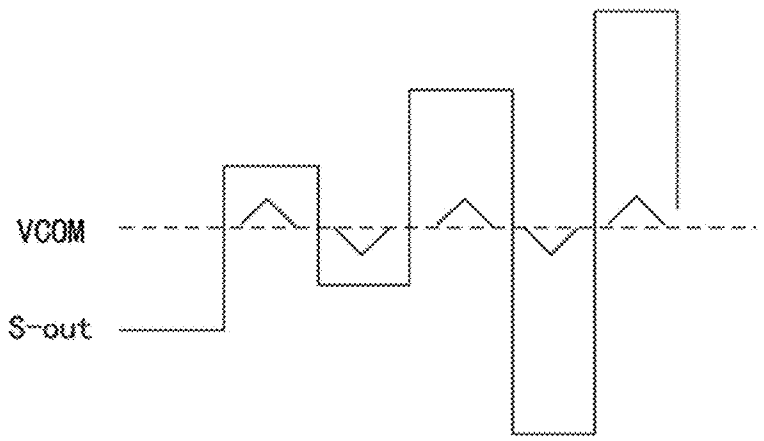
FIG. 5 is a schematic diagram of example voltage jitter at a common electrode provided by an embodiment of the present application.

However, VCOM is easily disturbed by data voltage, resulting in voltage jitter. This voltage jitter can cause abnormalities such as crosstalk in the picture. Specifically, as shown in FIG. 5, during a displaying of the display panel, the superposition of the impact of data voltage on VCOM causes VCOM to jitter. If the impact of the data voltage on VCOM is "+", the VCOM voltage will jitter upward. If the impact of the data voltage on VCOM is "−", the VCOM voltage will jitter downward. To improve this jitter, the display panel has introduced a picture detection function.

However, it is noted by the inventor based on research that, the display screen is completely black when the grayscale values of all sub-pixels are 0 in case that the picture detection function is enabled. At this time, no crosstalk abnormality will occur, and the picture detection function needs to be exited. However, in the related technology, after the picture detection function is enabled on the display panel, the conditions for exiting the picture detection function cannot include the situation that the display screen is completely black. At this time, the picture detection function cannot be accurately exited, which will cause a waste of resources.

To this end, embodiments of the present application provide a method for a picture detection. By changing the conditions for exiting the picture detection function, to enable the exit conditions of the picture detection function to cover situations such as a completely black screen, the picture detection function can be accurately exited, thereby saving resources.

To facilitate understanding, first, the relevant concepts in the method for the picture detection provided by the embodiments of the present application will be described.

1. Preset Detection Area

The preset detection area is part or all of the area in the display panel. The preset detection area may include x minimum detection units, where x is a positive integer. The size of the preset detection area may be set according to requirements. For example, the preset detection area may include 9 minimum detection units.

2. Minimum Detection Unit

The minimum detection unit includes at least one pixel, and each pixel includes three sub-pixels (red, green, blue (RGB)). That is to say, each minimum detection unit includes multiple sub-pixels.

3. Grayscale Value

Each sub-pixel on the display panel has its own corresponding grayscale value, and the grayscale value represents the luminous brightness of the sub-pixel. Generally, the grayscale value is a value between 0 and 255. The higher the value, the higher the brightness. In addition, it can be understood that the grayscale value of each sub-pixel in the display panel changes dynamically.

4. First Type of Sub-Pixel

In the embodiments of the present application, the first type of sub-pixel (also called pixel on) refers to a sub-pixel, in a certain minimum detection unit, that has a grayscale value being greater than or equal to a default high grayscale value (H) corresponding to the minimum detection unit when the picture detection function is enabled, that is, the first type of sub-pixel is the sub-pixel, in the minimum detection unit, that has a relatively larger grayscale value and brighter brightness. For example, when the default high grayscale value (H) corresponding to a certain minimum detection unit is 60, the first type of sub-pixel refers to the sub-pixel in the minimum detection unit whose grayscale value is greater than or equal to 60.

5. Second Type of Sub-Pixel

In the embodiments of the present application, the second type of sub-pixel (also called Pixel off) refers to a sub-pixel, in a certain minimum detection unit, that has a grayscale value being smaller than or equal to a default low grayscale value (L) corresponding to the minimum detection unit when the picture detection function is enabled, that is, the second type of sub-pixel, is the sub-pixel, in the minimum detection unit, that has a relatively smaller grayscale value and darker brightness. For example, when the default low grayscale value (L) corresponding to a certain minimum detection unit is 40, the second type of sub-pixel refers to the sub-pixel in the minimum detection unit whose grayscale value is smaller than or equal to 40. It should be noted that the default low grayscale value is smaller than the default high grayscale value with respect to the same minimum detection unit.

The method for the picture detection provided by an embodiment of the present application will be explained in detail below.

Figure 6:
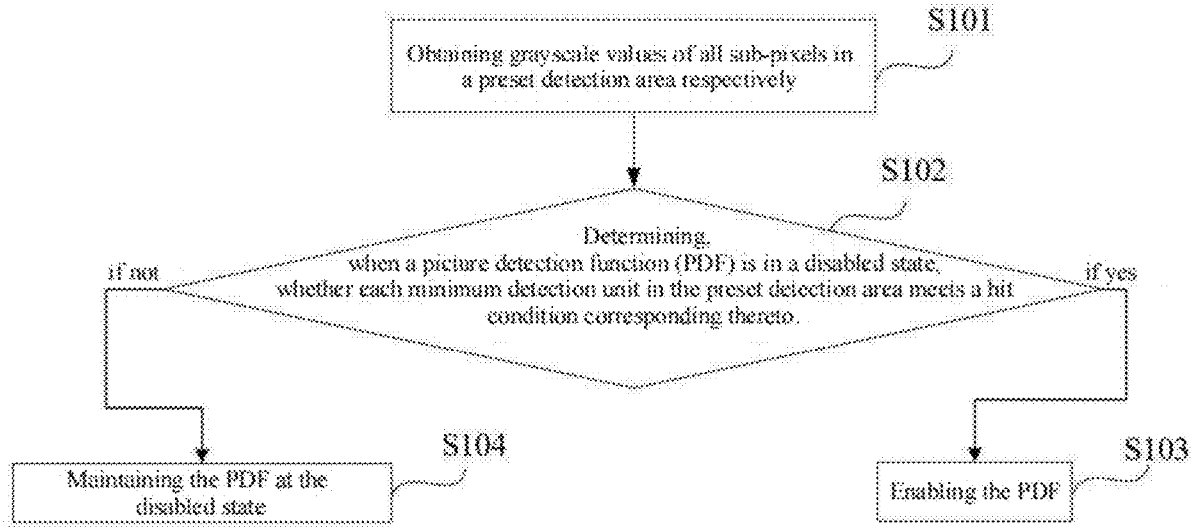
FIG. 6 is a flow chart of a method for enabling a picture detection provided by an embodiment of the present application.

First, a process of enabling the picture detection function is explained. FIG. 6 is a flow chart of a method for enabling a picture detection provided by an embodiment of the present application, and the method is applied to a display panel. Referring to FIG. 6, the method includes the following steps S101 to S104:

In step S101, grayscale values of all sub-pixels in a preset detection area are obtained.

As mentioned above, the grayscale values of sub-pixels in the display panel change dynamically. The grayscale values of sub-pixels are different when different frames are displayed.

Optionally, the display panel may periodically obtain the grayscale value of each sub-pixel in the preset detection area, and perform the following steps S102 to S104, or steps S201 to S203. In a particular embodiment, a period during which the display panel performs step S101 and other steps may be a refresh period of the picture. That is, the method according to the embodiment of the present application may be executed once every time a frame of picture is displayed by the display panel to determine whether to enable the picture detection function or to exit the picture detection function.

In step S102, it is determined whether each minimum detection unit in the preset detection area meets the respective hit condition (also called a second preset condition) when a picture detection function is in a disabled state, if the respective hit conditions are met, then step S103 is performed. If the respective hit conditions are not met, then step S104 is performed.

In the embodiment of the present application, the picture detection function refers to a picture detection function for the preset detection area. The picture detection function is in the disabled state means that the picture detection function has not been enabled, or the picture detection function has been enabled and then exited.

Each minimum detection unit has its own corresponding hit condition. In other words, x minimum detection units in the preset detection area are in a one-to-one correspondence with x hit conditions.

Particularly, taking any minimum detection unit in the preset detection area, such as the first minimum detection unit, as an example for explanation. The hit condition corresponding to the first minimum detection unit may be that: at least one sub-pixel of the first type and at least one sub-pixel of the second type are both presented in the first minimum detection unit. That is to say, the first minimum detection unit includes both the first type and the second type of sub-pixels.

It should be noted that in the embodiment of the present application, each minimum detection unit may have its own default high grayscale value (H) and default low grayscale value (L). That is to say, each minimum detection unit may have its own first type and second type of sub-pixels. For example, the default high grayscale value and the default low grayscale value corresponding to the minimum detection unit A is Ha and La. The default high grayscale value and the default low grayscale value corresponding to the minimum detection unit B may be Hb and Lb, then the first type of sub-pixel in the minimum detection unit A is a sub-pixel whose grayscale value is greater than or equal to Ha, and the second type of sub-pixel in the minimum detection unit A is a sub-pixel whose grayscale value is smaller than or equal to La. The first type of sub-pixel in the minimum detection unit B is a sub-pixel whose grayscale value is greater than or equal to Hb, and the second type of sub-pixel in the minimum detection unit B is a sub-pixel whose grayscale value is smaller than or equal to Lb. Each minimum detection unit has its own corresponding hit condition (i.e., the second preset condition) based on the default high grayscale value (H) and the default low grayscale value (L) corresponding thereto.

In this embodiment, the default high grayscale value corresponding to the first minimum detection unit is represented by Hn (also called a third value), and the default low grayscale value corresponding to the first minimum detection unit is represented by Ln (also called a fourth value), where Hn>Ln. Then, the hit condition corresponding to the first minimum detection unit may be expressed as: Pixelon≥Hn and Pixeloff≤Ln. For example, if Hn is 60 and Ln is 40, then the first type of sub-pixel in the first minimum detection unit is a sub-pixel whose grayscale value is greater than or equal to 60, and the second type of sub-pixel is a sub-pixel whose grayscale values is smaller than or equal to 40. In this case, if the first minimum detection unit includes both the sub-pixel whose grayscale value is greater than or equal to 60 and the sub-pixel whose grayscale value is smaller than or equal to 40, then it is determined that the first minimum detection unit meets the hit condition corresponded thereto.

Referring to the method for the first minimum detection unit, it is also determined whether the other minimum detection units meet their corresponding hit conditions. In case that each of the x minimum detection units meets its corresponding hit condition, then it is indicated that crosstalk or other abnormalities may occur in each current frame of picture, and the picture detection function needs to be enabled, and then step S103 is performed. In other cases, the step S104 is performed.

In step S103, the picture detection function is enabled.

In step S104, the picture detection function is maintained at the disabled state.

When the picture detection function is in the disabled state, if at least one minimum detection unit does not meet the hit condition corresponding to the minimum detection unit, then the picture detection function is maintained in the disabled state. That is to say, as long as one minimum detection unit does not meet the hit condition corresponding to the detection unit, indicating that no abnormal problem such as crosstalk is existed at this time, then there is no need to enable the picture detection function. At this time, the picture detection function continues to be in the disabled state.

Optionally, taking the first minimum detection unit as an example, the first minimum detection unit does not meet the hit condition corresponding to the first minimum detection unit may be that only one of sub-conditions of the corresponding hit condition is met, that is, the first minimum detection unit includes at least one sub-pixel of the first type, but no sub-pixel of the second type, or, the first minimum detection unit includes no sub-pixel of the first type but includes at least one sub-pixel of the second type. The formula may be expressed as: Pixelon≥Hn and Pixeloff>Ln, or alternatively, Pixelon<Hn and Pixeloff≤Ln. For example, if the default high grayscale value Hn is 60, and the default low grayscale value, i.e., the fourth value, Ln is 40, and in the next frame there is a minimum detection unit in which the grayscale values of all sub-pixels are greater than 40, then the corresponding hit condition is not met at this time, the picture detection function will continue to be in the disabled state.

It is noted based on research that crosstalk is caused by uneven polarities of sub-pixels in the display panel, and uneven polarity is due to the presence of both light and dark in the picture. As shown in FIG. 5, the greater a voltage difference between the data voltage and the VCOM, the brighter the sub-pixel, and the greater the impact on VCOM. the smaller the voltage difference between the data voltage and the VCOM, the darker the sub-pixel, and the smaller the impact on VCOM. It is also for this reason that the polarity distribution as originally shown in FIG. 4 is very uniform. Due to the presence of both light and dark, polarities at dark parts were removed, leaving only the bright parts, such that the polarity distribution will be uneven, which will lead to crosstalk.

A method for enabling a picture detection function is provided in an embodiment of the present application, which includes steps of: determining whether each minimum detection unit meets the second preset condition corresponding thereto when the picture detection function is in the disabled state; and enabling the picture detection function when each minimum detection unit meets the second preset condition corresponding thereto. It can be determined based on the second preset condition in this embodiment whether the brightness of the picture is uniform. If each minimum detection unit meets the second preset condition corresponding thereto, then it is indicated that the brightness of the current picture is uneven and the polarity of the sub-pixels is uneven, and then the picture detection function is enabled. This method combines the cause of crosstalk to set the hit conditions for enabling the picture detection function. The picture detection function can be enabled when crosstalk occurs, which avoids false triggering of enabling PDF, thus, the picture detection function will be more accurate. Moreover, due to the hit conditions, the PDF is maintained at the disabled state when crosstalk does not occur, that is, the picture detection function is disabled, thereby saving resources.

Figure 7:
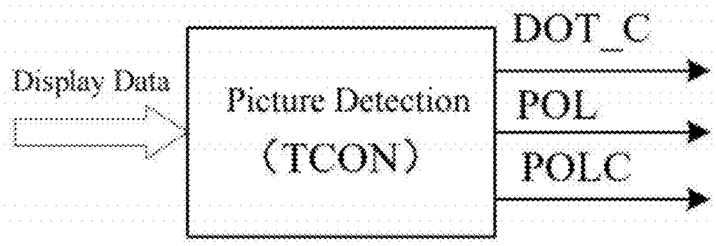
FIG. 7 is a schematic diagram of an example execution process of a picture detection function provided by the embodiment of the present application.

The following describes the process of enabling the picture detection function and the process of sub-pixel polarity inversion. FIG. 7 is a schematic diagram of an example of an execution process for the picture detection function provided by an embodiment of the present application. As shown in FIG. 7, display data of a display panel is sent by a system on chip (SOC) to a timing controller (TCON). The timing controller determines whether to enable the picture detection function by following the preceding steps based on the displayed data. If it is determined that the picture detection function needs to be enabled, then the timing controller outputs three polarity reversal control signals of DOT_C, POLC and POL to the drive circuit to invert the polarities of the sub-pixels.

FIG. 8 is a schematic diagram of sub-pixel polarity inversion provided by an embodiment of the present application. When the picture detection function is enabled, the timing controller outputs the polarity reversal control signal(s) DOT_C/POLC/POL to the drive circuit, causing the drive circuit to change the polarities at the sub-pixel electrodes Y1, Y2, Y3, Y4, Y5 and Y6, etc., to avoid abnormalities in the display screen.

In one embodiment, the default high grayscale value and the default low grayscale value are respectively determined based on original grayscale values of all sub-pixels in the first minimum detection unit.

The original grayscale values refer to the grayscale values of the sub-pixels before the picture detection function is enabled. Particularly, the maximum grayscale value and the minimum grayscale value among the original grayscale values of all sub-pixels in the first minimum detection unit can be obtained. Hn and Ln are determined based on the maximum grayscale value and the minimum grayscale value, where Hn and Ln are both smaller than the maximum grayscale value, and both are greater than the minimum grayscale value. In other words, Hn and Ln are between the maximum grayscale value and the minimum grayscale value in the first minimum detection unit. In this way, the first type of sub-pixel(s) and the second type of sub-pixel(s) in the first minimum detection unit can be determined based on Hn and Ln, covering all grayscale situations in the first minimum detection unit, and the relative brightness and darkness relevant to grayscale values of the sub-pixels in the first minimum detection unit can be determined, and then the corresponding second preset condition can be determined, thereby the accuracy of the picture detection function is improved.

FIG. 9 is a flow chart of a method for exiting a picture detection provided by an embodiment of the present application. Referring to FIG. 9, after the above step S101, the method may also include the following steps S201 to S203.

In step S201, it is determined whether at least one of the minimum detection units meets an exit condition (also called a first preset condition) corresponding thereto when the picture detection function is enabled. If at least one of the minimum detection units meets the exit condition corresponding thereto, then step S202 is performed; and if each of the minimum detection units does not meet the exit condition corresponding thereto, then step S203 is performed.

It should be noted that only when the picture detection function is enabled will it be judged whether the exit conditions need to be met, that is, whether the picture detection function needs to be exited. Similar to the hit condition, each minimum detection unit also has its own corresponding exit condition. In other words, x minimum detection units in a preset detection area are in a one-to-one correspondence with x exit conditions.

Particularly, taking the first minimum detection unit as an example, the exit condition corresponding to the first minimum detection unit is that: the grayscale value of at least one sub-pixel of the first type is smaller than or equal to a first value, or the grayscale value of at least one sub-pixel of the second type is greater than or equal to a second value, and the first value is greater than the second value.

It should be noted that for the same minimum detection unit, its first value (H−A) is smaller than the preset high grayscale value (H), and its second value (L+B) is greater than the default low grayscale value (L). Therefore, in the following embodiments, the first value is expressed as H−A, and the second value is expressed as L+B, where A>0, B>0, and H−A is greater than L+B. Then, the exit condition corresponding to a certain minimum detection unit can be expressed as: Pixelon≤H−A or Pixeloff≥L+B.

It can be understood that picture detection is a real-time detection. If the picture detection function is enabled when the display panel displays the n-th frame of picture, then the step of determining whether the first preset condition is met is required when displaying each frame of picture after the n-th frame of picture, to determine whether to exit the picture detection function. Continuing to take the first detection unit as an example, if the n-th frame of picture is displayed (that is, the picture detection function is enabled), it is determined that Hn is 60 and Ln is 40, and it is assumed that A is 5 and B is 5, then the first value is 55, the second value is 45. Then, during displaying of each frame of picture after the (n+1)-th frame of picture, if in the first detection unit, at least one sub-pixel of the first type has a grayscale pixel value being smaller than or equal to 55, or at least one sub-pixel of the second type has a grayscale value being greater than or equal to 45, then it is determined that the first frame measurement unit meets its exit condition. At this time, it can be determined that the conditions for exiting the picture detection function are currently met, and the picture detection function can be exited. If the first detection unit does not meet its exit condition, then it is further determined whether the next minimum detection unit meets the exit condition corresponding thereto. By analogy, until it is determined that one of the x minimum detection units meets its corresponding exit condition, then the picture detection function is exited.

In step S202, the picture detection function is exited.

It should be noted that in case that the picture detection function is enabled, the picture detection function enables the polarity to be reversed to achieve a uniform polarity distribution. In case that the picture detection function is enabled, if the first preset condition is met, then it is indicated that the grayscale value of the sub-pixel in the preset detection area has changed, and the brightness has also changed, which then indicates that the polarity has become uneven. At this time, it is necessary to exit the picture detection function, no longer continue to perform polarity reversal, to maintain the uniformity of polarity.

In step S203, the picture detection function is maintained at an enabled state.

That is to say, in case that the picture detection function is enabled, if the x minimum detection units do not meet the corresponding exit conditions, then it is indicated that the phenomenon of crosstalk is still existed, and then the picture detection function continues to be maintained at the enabled state.

Optionally, taking the first detection unit as an example, the exit condition corresponding to the first minimum detection unit is not met may be that: the grayscale value of the first type of sub-pixel is greater than the first value (H−A) and smaller than the default high grayscale value (H); and the grayscale value of the second type of sub-pixel is smaller than the second value (L+B), the formula may be expressed as: H−A<Pixelon<H and Pixeloff<L+B. The exit condition corresponding to the first minimum detection unit is not met may also be that: the grayscale value of the first type of sub-pixel is greater than or equal to the default high grayscale value (H); and the grayscale value of the second type of sub-pixel is greater than the default low grayscale value (L) and smaller than the second value (L+B), the formula may be expressed as Pixelon≥H and L<Pixeloff<L+B. By analogy, until all of the x minimum detection units do not meet their respective exit condition, then the picture detection function will continue to be maintained at the enabled state.

As mentioned above, crosstalk is caused by the uneven polarity of sub-pixels in the display panel, and the uneven polarity is due to the presence of both light and dark in the picture. For a completely black picture, the grayscale values of all sub-pixels are 0 and the polarities of all sub-pixel are uniform, so the impact of the data voltage on VCOM can be ignored.

In the method provided by the embodiments of the present application, the exit condition can cover a display screen where the polarities are uniformly distributed, thereby the problem of inaccurate PDF exit in related technologies can be solved. As illustrated with reference to FIG. 10A to FIG. 10C.

As an example, FIG. 10A to FIG. 10C are schematic diagrams showing a process for enabling or exiting the picture detection function provided by an embodiment of the present application. As shown in FIG. 10A, the brightness of a certain frame of picture is uneven. In this case, the picture detection function is enabled based on the process described in Embodiment 1 above. As shown in FIG. 10B, after the picture detection function is enabled, the brightness of a certain frame is still uneven, so the picture detection function remains enabled. As shown in FIG. 10C, when a certain frame of picture is completely black, the condition for exiting the picture detection function in the related technology is that: Pixelon≤H−A and Pixeloff≥L+B. Regarding the picture shown in FIG. 10C, the grayscale values of all sub-pixels are 0, the condition of Pixelon≤H−A is met, but the condition of Pixeloff≥L+B is not met, thus, the exit condition with respect to the picture shown in FIG. 10C is not met and the picture detection function continues to be remained.

In the method provided by the embodiment of the present application, the exit condition corresponding to each minimum detection unit is that: Pixelon≤H−A or Pixeloff≥L+B. For the picture shown in FIG. 10C, the grayscale value of each sub-pixel is 0, thus the condition Pixelon≤H−A is met as, for any minimum detection unit, 0≤H−A, that is, the condition for exiting PDF is met, and thus the picture detection function is exited. It can be seen that, in the method for the picture detection provided by the embodiment of the present application, the grayscale value of each sub-pixel in the preset detection area is obtained, and after the picture detection function is enabled, the picture detection function will be disabled when determining that at least one of the minimum detection units meets the corresponding exit condition. The picture detection function will remain enabled if the x minimum detection units do not meet their respective exit condition.

It can be seen that the method for the picture detection provided by the embodiment of the present application closely combines the crosstalk causes with the conditions for exiting the picture detection function by improving the conditions for exiting the picture detection function, so that the conditions for exiting the picture detection function can cover the entire black or full bright screen, and other situations where the polarity distribution is even and the picture detection function needs to exit. For pictures that will not cause crosstalk, the picture detection function is excluded (exited) which improves the accuracy of the picture detection function and avoids waste of resources.

Figure 11:
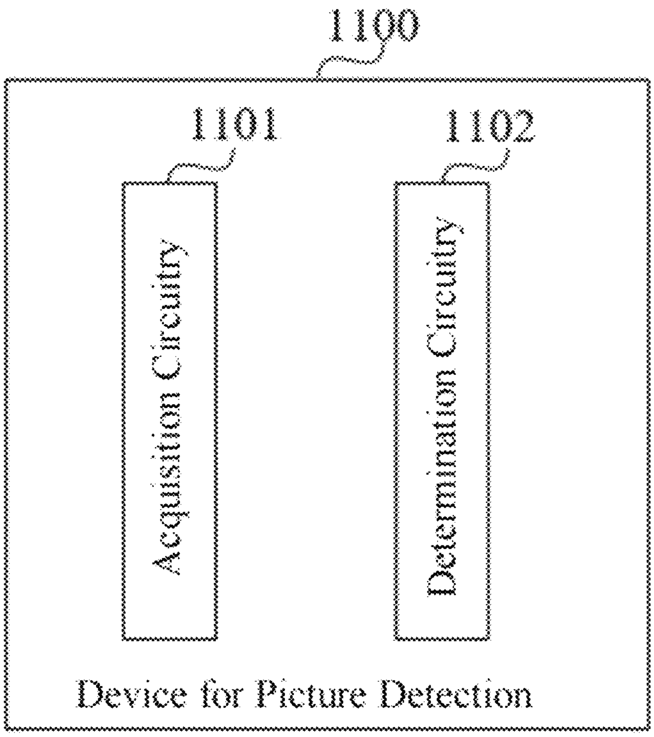
FIG. 11 is a schematic structural diagram of a device for a picture detection provided by an embodiment of the present application.

FIG. 11 shows a schematic structural diagram of a device for a picture detection provided by the present application. The device 1100 includes: an acquisition circuitry 1101 and a determination circuitry 1102.

The acquisition circuitry 1101 is configured to obtain a grayscale value of each sub-pixel in each minimum detection unit.

The determination circuitry 1102 is configured to exit a picture detection function if at least one of x minimum detection units meets a first preset condition corresponding thereto when the picture detection function for a preset detection area is in an enabled state. A first preset condition corresponding to a first minimum detection unit is that the grayscale value of at least one sub-pixel of a first type is smaller than or equal to a first value, or the grayscale value of at least one sub-pixel of a second type is greater than or equal to a second value. The first minimum detection unit is any one of the x minimum detection units. The sub-pixel of the first type refers to a sub-pixel in the first minimum detection unit whose grayscale value is greater than or equal to a third value when the picture detection function is enabled. The sub-pixel of the second type refers to a sub-pixel in the first minimum detection unit whose grayscale value is smaller than or equal to a fourth value when the picture detection function is enabled. The first value is smaller than the third value, the second value is greater than the fourth value, the first value is greater than the second value, and the third value is greater than the fourth value.

In some embodiments, the third value and the fourth value are respectively determined based on original grayscale values of all sub-pixel in the first minimum detection unit. The original grayscale values refer to grayscale values of the sub-pixels before the picture detection function is enabled.

In some embodiments, the determination circuitry 1102 is also configured to maintain the picture detection function at an enabled state if each minimum detection unit does not meet its corresponding first preset condition when the picture detection function is in the enabled state.

In some embodiments, the determination circuitry 1102 is also configured to enable the picture detection function if each minimum detection unit meets its corresponding second preset condition when the picture detection function is in a disabled state. A second preset condition corresponding to the first minimum detection unit includes that at least one sub-pixel of the first type and at least one sub-pixel of the second type are both presented in the first minimum detection unit.

In some embodiments, the determination circuitry 1102 is also configured to maintain the picture detection function at the disabled state if at least one minimum detection unit does not meet the corresponding second preset condition when the picture detection function is in the disabled state.

In some embodiments, the determination circuitry 1102 is also configured to determine that the second preset condition corresponding to the first minimum detection unit also includes that an area of the preset detection area exceeds a preset area threshold.

In some embodiments, the determination circuitry 1102 is also configured to exit the picture detection function after scanning a current frame of picture and before starting to scan a next frame of picture.

Specific manners in which the device 1100 performs the multi-agent parameter sharing method and the beneficial effects produced can be found in the relevant descriptions in the method embodiments, and will not be described again here.

Figure 12:
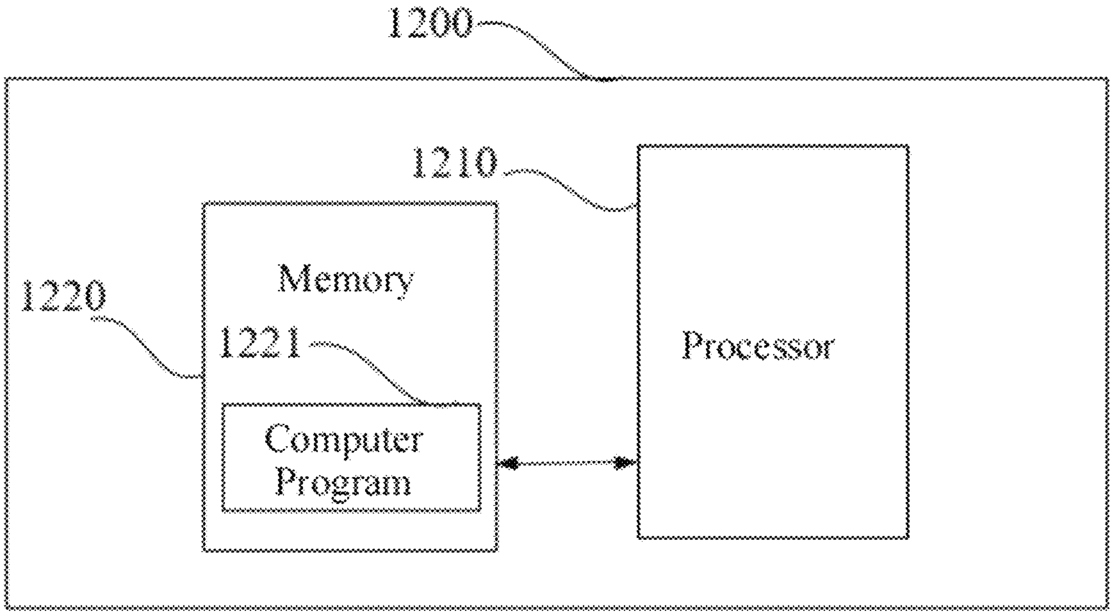
FIG. 12 is a schematic structural diagram of a display panel provided by an embodiment of the present application.

FIG. 12 is a schematic structural diagram of a display panel provided by an embodiment of the present application. As shown in FIG. 12, the display panel 1200 includes: a processor 1210, a memory 1220, and a computer program 1221 stored in the memory 1220 and executable by the processor 1210. The computer program 1221, when executed by the processor 1210, enables steps in the method for the picture detection in the above embodiments to be implemented.

The processor 1210 may be a central processing unit (CPU). The processor 1210 may also be other general-purpose processors, a digital signal processor (DSP), or an application specific integrated circuit (ASIC), a field-programmable gate array (FPGA) or other programmable logic devices, discrete gate or transistor logic devices, discrete hardware components, etc. The general-purpose processor may be a microprocessor or any conventional processor.

In some embodiments, the memory 1220 may be an internal storage unit of the display panel 1200, such as a hard disk or a memory of the display panel 1200. In other embodiments, the memory 1220 may also be an external storage device of the display panel 1200, such as a plug-in hard disk, a smart media card (SMC), or a secure digital (SD) card, a flash card, etc., equipped on the display panel 1200. Further, the memory 1220 may also include both an internal storage unit and an external storage device of the display panel 1200. The memory 1220 is configured to store operating systems, application programs, boot loaders, data, and other programs. The memory 1220 may also be configured to temporarily store data that has been output or is to be output.

Embodiments of the present application also provide a computer-readable storage medium. The computer-readable storage medium stores a computer program. The computer program, when executed by a processor, can cause the steps in the above method embodiments to be implemented.

Integrated units, if implemented in the form of software functional units and marketed or used as stand-alone products, may be stored in a computer-readable storage medium. Based on this understanding, the present application may implement all or part of the processes in the above method embodiments by instructing relevant hardware through a computer program. The computer program may be stored in a computer-readable storage medium, and the computer program when being executed by the processor, can causes the steps of each of the above method embodiments to be implemented. Herein, the computer program includes a computer program code, which may be in a source code form, an object code form, an executable file or some intermediate forms, etc. The computer-readable medium may at least include: any entity or device capable of carrying the computer program code to a camera device/terminal device, a recording medium, a computer memory, a read-only memory (ROM), a random-access memory (RAM), a compact disc read-only memory (CD-ROM), a tape, a floppy disk or an optical data storage device, etc. The computer-readable storage medium mentioned in the present application may be a non-volatile storage medium, in other words, may be a non-transitory storage medium.

It should be understood that all or part of the steps of the above embodiments may be implemented through software, hardware, firmware, or any combination thereof. It may be implemented in whole or in part in the form of a computer program product when implemented by using software. The computer program product includes one or more computer instructions. The computer instructions may be stored in the computer-readable storage medium as above-described.

In the above embodiments, each embodiment is described with its own emphasis. For parts that are not detailed or documented in a certain embodiment, references may be made to the relevant descriptions of other embodiments.

It will be appreciated by those of ordinary skill in the art that the units and algorithm steps of each example described in conjunction with the embodiments disclosed herein may be implemented through electronic hardware or a combination of computer software and electronic hardware. Whether these functions are performed in hardware or software depends on the specific application and design constraints of the technical scheme. Skilled artisans may implement the described functionality using different methods for each specific application, but such implementations should not be considered beyond the scope of the present application.

In the embodiments provided in the present application, it should be understood that the disclosed device/display panel and method may be implemented in other ways. For example, the device/computer equipment embodiments described above are only illustrative. For example, the division of modules or units is only a logical function division. In actual implementation, other division methods may also be possible, such as multiple units or components may be combined or may be integrated into another system, or some features may be ignored, or not implemented. On the other hand, the coupling or direct coupling or communication connection between each other shown or discussed may be an indirect coupling or communication connection via some interfaces, devices or units, and may also be connected in electrical, mechanical or other forms.

Units described as separate components may or may not be physically separated. A component shown as a unit may or may not be a physical unit, that is, it may be located in one place, or it may be distributed to multiple network units. Some or all of the units may be selected according to actual needs to achieve the purpose of the scheme of the embodiment.

The above embodiments are only used to illustrate the technical schemes of the present application, and are not intended to limit the present application. Although the present application has been described in detail with reference to the foregoing embodiments, those of ordinary skills in the art should understand that the technical schemes described in the foregoing embodiments may still be modified, or some or all of the technical features thereof may be equivalently substituted; and these modifications or substitutions do not make the essence of the corresponding technical schemes deviate from the scope pf the technical schemes of the various embodiments of the present application, and thus should all be included within the protection scope of the present application.

What is claimed is:

1. A method for a picture detection, configured to perform the picture detection on a preset detection area of a display panel, and the preset detection area comprising x minimum detection units, each of the x minimum detection units comprising multiple sub-pixels, wherein x is a positive integer, and the method comprises:

obtaining a grayscale value of each sub-pixel in each of the x minimum detection units, respectively;

exiting a picture detection function if at least one of the x minimum detection units meets a first preset condition corresponding to the at least one of the x minimum detection units when the picture detection function for the preset detection area is in an enabled state;

wherein a first preset condition corresponding to a first minimum detection unit is that the grayscale value of at least one sub-pixel of a first type is smaller than or equal to a first value, or the grayscale value of at least one sub-pixel of a second type is greater than or equal to a second value;

the first minimum detection unit is any one of the x minimum detection units, the sub-pixel of the first type refers to a sub-pixel in the first minimum detection unit whose grayscale value is greater than or equal to a third value when the picture detection function is enabled, and the sub-pixel of the second type refers to a sub-pixel in the first minimum detection unit whose grayscale value is smaller than or equal to a fourth value when the picture detection function is enabled; the first value is smaller than the third value, the second value is greater than the fourth value, the first value is greater than the second value, and the third value is greater than the fourth value.

2. The method according to claim 1, wherein the third value and the fourth value are respectively determined based on original grayscale values of the multiple sub-pixels in the first minimum detection unit, and the original grayscale values refer to grayscale values of the multiple sub-pixels before the picture detection function is enabled.

3. The method according to claim 1, wherein the method further comprises:

maintaining the picture detection function at the enabled state if each of the x minimum detection units does not meet its corresponding first preset condition when the picture detection function is in the enabled state.

4. The method according to claim 1, wherein the method further comprises:

enabling the picture detection function if each of the x minimum detection units meets its corresponding second preset condition when the picture detection function is in a disabled state; and a second preset condition corresponding to the first minimum detection unit comprises that at least one sub-pixel of the first type and at least one sub-pixel of the second type are both presented in the first minimum detection unit.

5. The method according to claim 4, wherein the method further comprises:

maintaining the picture detection function at the disabled state if at least one of the x minimum detection units does not meet its corresponding second preset condition when the picture detection function is in the disabled state.

6. The method according to claim 4, wherein the second preset condition corresponding to the first minimum detection unit further comprises that an area of the preset detection area exceeds a preset area threshold.

7. The method according to claim 1, wherein said exiting the picture detection function comprises:

exiting the picture detection function after scanning a current frame of picture and before starting to scan a next frame of picture.

8. A device for a picture detection, configured to perform the picture detection on a preset detection area of a display panel, and the preset detection area comprising x minimum detection units, each of the x minimum detection units comprising multiple sub-pixels, wherein x is a positive integer, and the device for the picture detection comprises:

an acquisition circuitry configured to obtain a grayscale value of each sub-pixel in each of the x minimum detection units, respectively; and a determination circuitry configured to exit a picture detection function if at least one of the x minimum detection units meets a first preset condition corresponding to the at least one of the x minimum detection units when the picture detection function for the preset detection area is in an enabled state;

wherein a first preset condition corresponding to a first minimum detection unit is that the grayscale value of at least one sub-pixel of a first type is smaller than or equal to a first value, or the grayscale value of at least one sub-pixel of a second type is greater than or equal to a second value; the first minimum detection unit is any one of the x minimum detection units, the sub-pixel of the first type refers to a sub-pixel in the first minimum detection unit whose grayscale value is greater than or equal to a third value when the picture detection function is enabled, the sub-pixel of the second type refers to a sub-pixel in the first minimum detection unit whose grayscale value is smaller than or equal to a fourth value when the picture detection function is enabled; the first value is smaller than the third value, the second value is greater than the fourth value, the first value is greater than the second value, the third value is greater than the fourth value.

9. A display panel, comprising a memory, a processor, and a computer program stored in the memory and executable by the processor, wherein the computer program, when executed by the processor, causes the display panel to perform operations that comprise:

obtaining a grayscale value of each sub-pixel in each of x minimum detection units, respectively;

exiting a picture detection function if at least one of the x minimum detection units meets a first preset condition corresponding to the at least one of the x minimum detection units when the picture detection function for a preset detection area is in an enabled state;

wherein a first preset condition corresponding to a first minimum detection unit is that the grayscale value of at least one sub-pixel of a first type is smaller than or equal to a first value, or the grayscale value of at least one sub-pixel of a second type is greater than or equal to a second value;

the first minimum detection unit is any one of the x minimum detection units, and the sub-pixel of the first type refers to a sub-pixel in the first minimum detection unit whose grayscale value is greater than or equal to a third value when the picture detection function is enabled, the sub-pixel of the second type refers to a sub-pixel in the first minimum detection unit whose grayscale value is smaller than or equal to a fourth value when the picture detection function is enabled; the first value is smaller than the third value, the second value is greater than the fourth value, the first value is greater than the second value, the third value is greater than the fourth value.

10. The display panel according to claim 9, wherein the third value and the fourth value are respectively determined based on original grayscale values of multiple sub-pixels in the first minimum detection unit, and the original grayscale values refer to grayscale values of the multiple sub-pixels before the picture detection function is enabled.

11. The display panel according to claim 9, wherein the operations further comprise:

maintaining the picture detection function at the enabled state if each of the x minimum detection units does not meet its corresponding first preset condition when the picture detection function is in the enabled state.

12. The display panel according to claim 9, wherein the operations further comprise:

enabling the picture detection function if each of the x minimum detection units meets its corresponding second preset condition when the picture detection function is in a disabled state; and a second preset condition corresponding to the first minimum detection unit comprises that at least one sub-pixel of the first type and at least one sub-pixel of the second type are both presented in the first minimum detection unit.

13. The display panel according to claim 12, wherein the operations further comprise:

maintaining the picture detection function at the disabled state if at least one of the x minimum detection units does not meet its corresponding second preset condition when the picture detection function is in the disabled state.

14. The display panel according to claim 12, wherein the second preset condition corresponding to the first minimum detection unit further comprises that an area of the preset detection area exceeds a preset area threshold.

15. The display panel according to claim 9, wherein the operation of exiting the picture detection function comprises:

exiting the picture detection function after scanning a current frame of picture and before starting to scan a next frame of picture.

16. A non-transitory computer-readable storage medium in which a computer program is stored, wherein the computer program, when executed by a processor, causes the following operations to be performed:

obtaining a grayscale value of each sub-pixel in each of x minimum detection units, respectively;

exiting a picture detection function if at least one of the x minimum detection units meets a first preset condition corresponding to the at least one of the x minimum detection units when the picture detection function for a preset detection area is in an enabled state;

wherein a first preset condition corresponding to a first minimum detection unit is that the grayscale value of at least one sub-pixel of a first type is smaller than or equal to a first value, or the grayscale value of at least one sub-pixel of a second type is greater than or equal to a second value;

the first minimum detection unit is any one of the x minimum detection units, and the sub-pixel of the first type refers to a sub-pixel in the first minimum detection unit whose grayscale value is greater than or equal to a third value when the picture detection function is enabled, the sub-pixel of the second type refers to a sub-pixel in the first minimum detection unit whose grayscale value is smaller than or equal to a fourth value when the picture detection function is enabled; the first value is smaller than the third value, the second value is greater than the fourth value, the first value is greater than the second value, the third value is greater than the fourth value.

17. The non-transitory computer-readable storage medium according to claim 16, wherein the third value and the fourth value are respectively determined based on original grayscale values of multiple sub-pixels in the first minimum detection unit, and the original grayscale values refer to grayscale values of the multiple sub-pixels before the picture detection function is enabled.

18. The non-transitory computer-readable storage medium according to claim 16, wherein the operations further comprise:

maintaining the picture detection function at the enabled state if each of the x minimum detection units does not meet its corresponding first preset condition when the picture detection function is in the enabled state.

19. The non-transitory computer-readable storage medium according to claim 16, wherein the operations further comprise:

enabling the picture detection function if each of the x minimum detection units meets its corresponding second preset condition when the picture detection function is in a disabled state; and a second preset condition corresponding to the first minimum detection unit comprises that at least one sub-pixel of the first type and at least one sub-pixel of the second type are both presented in the first minimum detection unit.

20. The non-transitory computer-readable storage medium according to claim 19, wherein the operations further comprise:

maintaining the picture detection function at the disabled state if at least one of the x minimum detection units does not meet its corresponding second preset condition when the picture detection function is in the disabled state.

* * * * *